UNITED STATES PATENT OFFICE.

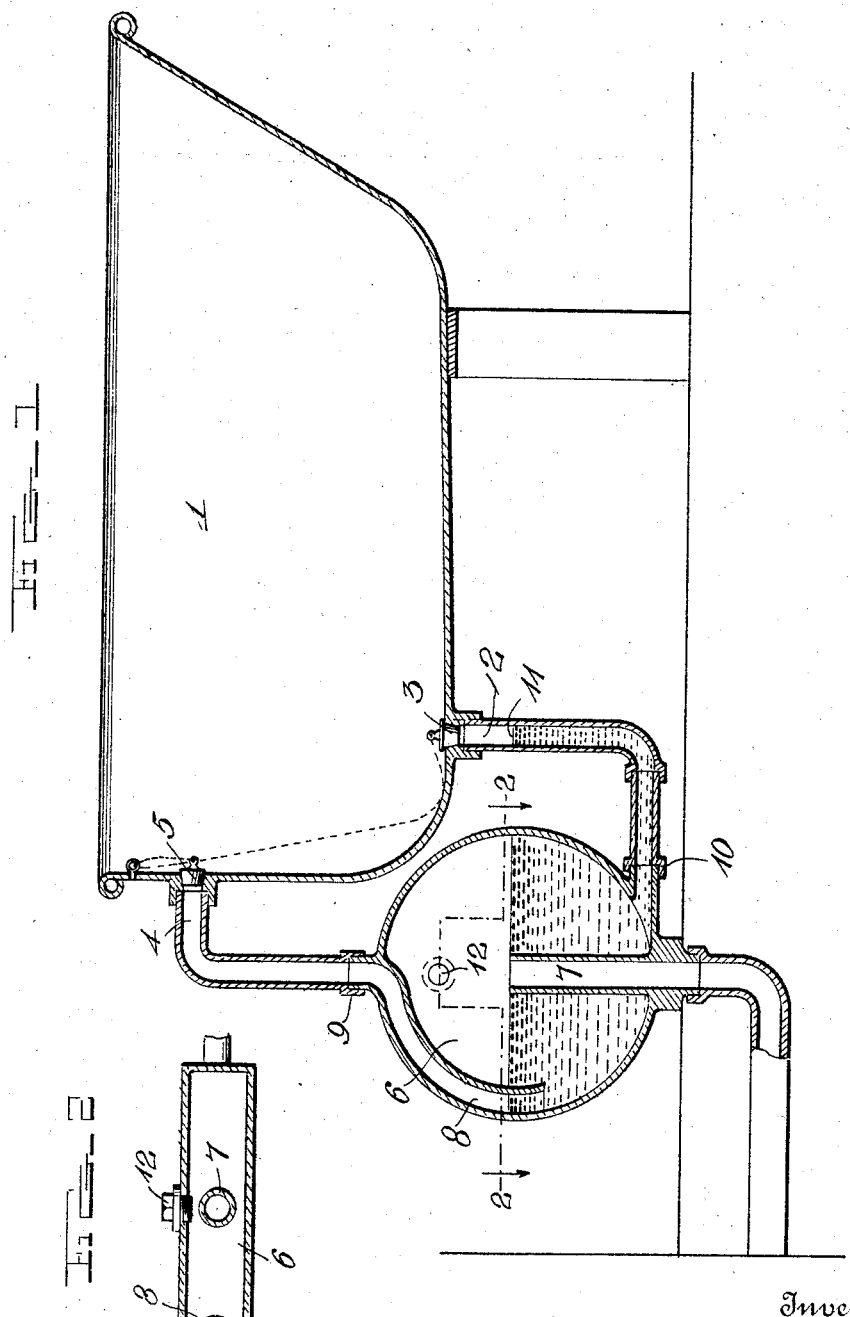

JOHN R. WILLIAMS, OF MILWAUKEE, WISCONSIN.

WASTE OVERFLOW AND TRAP.

No. 907,211. Specification of Letters Patent. Patented Dec. 22, 1908.

Application filed April 25, 1908. Serial No. 429,265.

*To all whom it may concern:*

Be it known that I, JOHN R. WILLIAMS, a citizen of the United States, residing at Milwaukee, in the county of Milwaukee and State of Wisconsin, have invented certain new and useful Improvements in Waste Overflows and Traps; and I do declare the following to be a full, clear, and exact description of the invention, such as will enable others skilled in the art to which it appertains to make and use the same.

This invention relates to means for preventing the passage of sewer gas through waste and overflow pipes of tubs, wash-basins and the like.

The object of the invention is to combine with the waste and overflow a simply-constructed and efficient device for sealing said pipes against the entrance therethrough of sewer gas.

With this and other objects in view, the invention consists of certain novel features of construction, combination and arrangement of parts as will be more fully described and particularly pointed out in the appended claim.

Figure 1 of the accompanying drawings is a vertical section of this improved device applied; and Fig. 2 is a horizontal section taken on line 2—2 of Fig. 1.

In the embodiment illustrated, the device is shown applied to a bath tub 1 of ordinary construction, having the usual waste passage 2 adapted to be closed by a plug 3 and an overflow passage 4 having a plug 5 for closing it. A trap 6 of any desired shape and size is arranged preferably near the bottom of the bath tub or at any desired point and has an outlet pipe 7 connected therewith and extending upwardly thereinto to a predetermined point and for a purpose to be described. A pipe 8 is connected with the overflow passage 4 and extends into said trap or receptacle 6 terminating at a point below the upper end of the outlet pipe 7, said receptacle being filled with water to a point near the upper end of said pipe 7 forms a seal for the lower end of the overflow pipe 8. This pipe 8 is preferably connected with the trap by a slip-joint 9 provided with the usual lead washer for forming a gas-tight joint. The waste passage 2 is connected with said trap preferably at its lower end, as shown, by any suitable means such as a slip-joint 10, and the water passing from said pipe 2 into said receptacle 6 causes the water in the receptacle to rise above the upper end of the pipe 7 and flow through said pipe into the sewer, the water contained in said trap or receptacle 6 also forms a seal for the pipe 2 and stands in said pipe normally at the point marked 11. This trap 6 is preferably provided with a removable closure 12 preferably arranged at the upper end thereof for cleaning out the trap when necessary.

It will be evident that by the use of this device a reliable seal is formed for both the overflow and the waste pipes so that no gas can pass therethrough into the tub and out into the room.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention as defined in the appended claim.

I claim as my invention:—

A trap comprising a casing having a discharge pipe projecting upwardly thereinto through the bottom thereof a predetermined distance, an inlet pipe extending through the top of said casing and following the contour of the inner face thereof and terminating at a point below the upper end of said discharge pipe, and an L-shaped inlet pipe connected at the free end of one arm near the bottom of said casing at one side thereof and having its free arm extended upwardly parallel with said casing to cause the water to rise in said arm to form a water seal in the pipe.

In testimony whereof I have hereunto set my hand in presence of two subscribing witnesses.

JOHN R. WILLIAMS.

Witnesses:
FRANK SCHWINN,
W. E. GITTINS.